(12) United States Patent
Nakama et al.

(10) Patent No.: US 6,360,041 B1
(45) Date of Patent: Mar. 19, 2002

(54) OPTICAL DEMULTIPLEXER AND METHOD OF ASSEMBLING OPTICAL DEMULTIPLEXER IN OPTICAL AXIS ALIGNMENT

(75) Inventors: Kenichi Nakama; Tadashi Koyama, both of Osaka (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/539,187

(22) Filed: Mar. 30, 2000

(30) Foreign Application Priority Data

Mar. 30, 1999 (JP) .......................................... 11-088583

(51) Int. Cl.⁷ .............................. G02B 6/34; H04J 14/02
(52) U.S. Cl. ............................ 385/37; 385/31; 385/33; 385/39; 385/52; 359/127; 359/130
(58) Field of Search ........................ 385/14, 15, 31, 385/33, 37, 39, 46, 47, 52; 359/115, 124, 127, 130

(56) References Cited

U.S. PATENT DOCUMENTS

| 4,057,319 | A | * | 11/1977 | Ash et al. ................. 385/37 X |
| 4,387,955 | A | * | 6/1983 | Ludman et al. ........... 385/37 X |
| 4,749,250 | A | * | 6/1988 | Carter ....................... 385/52 X |
| 4,934,784 | A | * | 6/1990 | Kapany et al. ............ 385/37 X |
| 5,117,478 | A | * | 5/1992 | Cobb, Jr. et al. ........... 385/133 |
| 5,181,265 | A | * | 1/1993 | Nishiwaki et al. ............ 385/33 |
| 5,555,334 | A | * | 9/1996 | Ohnishi et al. ............... 385/93 |
| 5,987,200 | A | * | 11/1999 | Fleming et al. .............. 385/37 |
| 6,011,884 | A | * | 1/2000 | Dueck et al. ................. 385/24 |
| 6,069,987 | A | * | 5/2000 | Sasaki et al. ................. 385/24 |
| 6,147,341 | A | * | 11/2000 | Lemaire et al. ............ 385/37 X |
| 6,263,134 | B1 | * | 7/2001 | Laude .......................... 385/37 |
| 6,275,630 | B1 | * | 8/2001 | Yang et al. ................... 385/37 |

FOREIGN PATENT DOCUMENTS

| JP | 57-026720 | 2/1982 | .............. G01J/3/18 |
| JP | 57-120864 | 7/1982 | ............. G01R/15/07 |
| JP | 60-140315 | 7/1985 | ............. G02B/27/28 |
| JP | 60-235027 | 11/1985 | |
| JP | 60-235028 | 11/1985 | |
| JP | 61-070513 | 4/1986 | .............. G02B/6/28 |
| JP | 61-129539 | 6/1986 | .............. G01J/3/02 |
| JP | 2-159528 | 6/1990 | .............. G01J/3/12 |
| JP | 8-075948 | 3/1996 | ............. G02B/6/293 |
| JP | 9-054228 | 2/1997 | .............. G02B/6/42 |
| JP | 9-073020 | 3/1997 | .............. G02B/6/12 |

OTHER PUBLICATIONS

Kobayashi, K., et al., "Microoptic Grating Multiplexers and Optical Isolators for Fiber–Optic Communications", *IEEE –Journal of Quantum Electronics*, QE–16 (1), pp. 11–22, (Jan. 1980).

McMahon, D.H., et al., "Echelon grating multiplexers for hierarchically multiplexed fiber–optic communications networks", *Applied Optics, 26(11)*, pp. 2188–2196, (Jun. 1987).

* cited by examiner

*Primary Examiner*—Brian Healy
(74) *Attorney, Agent, or Firm*—Schwegman, Lundberg, Woessner & Kluth, P.A.

(57) ABSTRACT

An optical demultiplexer has a plurality of transparent or translucent tubes combined in axially slidably interfitting relationship to each other. An input optical fiber, a collimator lens, and a diffraction grating are mounted on the tubes, preferably on end faces of the tubes. The optical demultiplexer can be assembled for centered alignment by installing the input optical fiber, the collimator lens, and the diffraction grating on the tubes, and sliding the tubes relatively to each other according to passive alignment.

14 Claims, 1 Drawing Sheet

OPTICAL DEMULTIPLEXER AND METHOD OF ASSEMBLING OPTICAL DEMULTIPLEXER IN OPTICAL AXIS ALIGNMENT

BACKGROUND OF THE INVENTION

1. Field of the Invention

The present invention relates to an optical demultiplexer primarily for use in wavelength division multiplexing optical communications, and a method of assembling an optical demultiplexer in optical axis alignment.

2. Description of the Related Art

Heretofore, it has been customary to assemble an optical demultiplexer by securing its various optical components to a jig by adhesive bonding for optical axis alignment, centering and fixing the optical components secured to the jig on a planar board by way of active alignment, and finally placing the planar board, to which the jig holding the optical components is fixed, in an opaque case of stainless steel or aluminum.

According to another conventional practice, various optical components are inserted into a single metal tube, and centered and fixed in position within the metal tube by way of active alignment while their positions are being observed with either an observing tool inserted into the metal tube through an open end thereof or a naked eye through an open end of the metal tube. The term "active alignment" refers to a process of centering the optical components by entering light via an optical fiber and moving the optical components slightly for an optimum position (for a maximum optical output power) while monitoring an optically coupled state of the optical components.

With the former assembling technique, it is difficult to align the optical axes of the optical components with each other because of variations of the outside diameters of the optical components and variations of the machining accuracy of the jig which is used to achieve optical axis alignment, and it is also difficult to set surfaces of the optical components or various optical elements to desired angles with respect to the optical axis of the optical demultiplexer or with respect to each other. Even after the optical components have been bonded to the planar board, since the setup of the optical components is not held in axial symmetry with respect to the optical axis of the optical demultiplexer, the optical performance of the optical demultiplexer tends to be unstable when subjected to temperature changes and vibrations.

The latter assembling practice has been disadvantageous in that when the optical components are aligned in the metal tube, they are liable to suffer angular deviations from the optical axis of the optical demultiplexer, resulting in a failure to achieve designed optical performance after the optical components are bonded in position. Furthermore, inasmuch as the optical components in the metal tube cannot directly be observed from outside of the metal tube, it is difficult to make accurate adjustments for centering the optical components for alignment and mechanically positioning the optical components in desired positions.

SUMMARY OF THE INVENTION

It is therefore an object of the present invention to inexpensively provide an optical demultiplexer whose optical components are aligned easily and highly accurately with each other without active alignment that has heretofore been required for highly accurate centering or adjustments and hence within a reduced period of time in the absence of active alignment.

According to the present invention, there is provided an optical demultiplexer comprising a plurality of tubes combined in axially slidably interfitting relationship to each other, the tubes being permeable to light, an input optical fiber, a collimator lens, and a diffraction grating, the input optical fiber, the collimator lens, and the diffraction grating being mounted on the tubes. Each of the tubes preferably comprises a hollow cylindrical tube.

The optical fiber, the collimator lens, and the diffraction grating are fixed to end faces of the tubes, preferably by adhesive bonding.

Each of the tubes is made of a material selected from the group consisting of a transparent material, a translucent material, and a colored material.

Each of the tubes may have a ground outer surface if they could be axially slidably interfitted to each other.

Preferably, each of the tubes has a coefficient of linear expansion which is at most $50 \times 10^{-7}/°C$.

The diffraction grating preferably comprises a reflective diffraction grating and is made of a material which is the same as each of the tubes.

The optical demultiplexer further comprises a detector for detecting light introduced from the input optical fiber, applied through the collimator lens to the diffraction grating, demultiplexed by the diffraction grating, and converged by the collimator lens. Preferably, the detector is positioned in conjugate relationship to an end of the input optical fiber fixed to the end face of one of the tubes. The detector comprises a photodetector array for detecting focused spots of the light demultiplexed by the diffraction grating and converged by the collimator lens.

The tubes may include three tubes, the input optical fiber, the collimator lens, and the diffraction grating being mounted respectively on the three tubes. The tube on which the input optical fiber is mounted and the tube on which the diffraction grating is mounted are slidably fitted over respective opposite ends of the tube on which the collimator lens is mounted.

Alternatively, the tubes may include two tubes, the input optical fiber being mounted on an end face of one of the two tubes, the collimator lens and the diffraction grating being mounted on respective opposite end faces of the other of the two tubes. The tube on which the input optical fiber is mounted is slidably fitted over the tube on which the collimator lens and the diffraction grating are mounted.

According to the present invention, there is also provided a method of assembling an optical demultiplexer having an input optical fiber, a collimator lens, and a diffraction grating, comprising the steps of preparing a plurality of tubes dimensioned to be combined in axially slidably interfitting relationship to each other, the tubes being permeable to light, installing the input optical fiber, the collimator lens, and the diffraction grating on the tubes, bringing the tubes into axially slidably interfitting relationship to each other, and sliding the tubes relatively to each other to set the distance between reference points related to the input optical fiber, the collimator lens, and the diffraction grating to a predetermined value for thereby achieving centered alignment.

If the tubes include three tubes, then the optical demultiplexer is assembled for centered alignment by installing the input optical fiber, the collimator lens, and the diffraction grating on the three tubes, bringing the tubes into axially slidably interfitting relationship to each other, and sliding the tubes relatively to each other to set the two distances between reference points related to the input optical fiber, the collimator lens, and the diffraction grating to respective predetermined values for thereby achieving centered alignment.

If the tubes include two tubes, then the optical demultiplexer is assembled for centered alignment by installing the input optical fiber, the collimator lens, and the diffraction grating on the two tubes, bringing the tubes into axially slidably interfitting relationship to each other, and sliding the tubes relatively to each other to set the distance between reference points related to the input optical fiber, the collimator lens, and the diffraction grating to a predetermined value for thereby achieving centered alignment.

Specifically, after the optical components, i.e., the input optical fiber, the collimator lens, and the diffraction grating have been installed on the tubes, the tubes are brought into slidably interfitting relationship to each other. Then, the tubes are axially slid relatively to each other to adjust the distances between the input optical fiber, the collimator lens, and the diffraction grating, and angularly slid relatively to each other to adjust the relative angles between the input optical fiber, the collimator lens, and the diffraction grating. Such distance and angular adjustments can be made by passive alignment which, rather than applying a light beam to the optical demultiplexer, achieves optimally aligned positions by moving the tubes into alignment with alignment markers or reference planes as observed from outside of the tubes. The time needed to perform the passive alignment is shorter than the time needed to perform active alignment, and s the optical demultiplexer may be manufactured and assembled inexpensively.

If the tubes are axially symmetrical with respect to the optical axis, e.g., comprise hollow cylindrical tubes, then the optical performance of the optical demultiplexer is stable when subjected to temperature changes and vibrations after the optical components are fixed to the tubes. If the diffraction grating is made of the same material as the tubes, then the diffraction grating has the same coefficient of linear expansion as the tubes, and hence is thermally stable.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
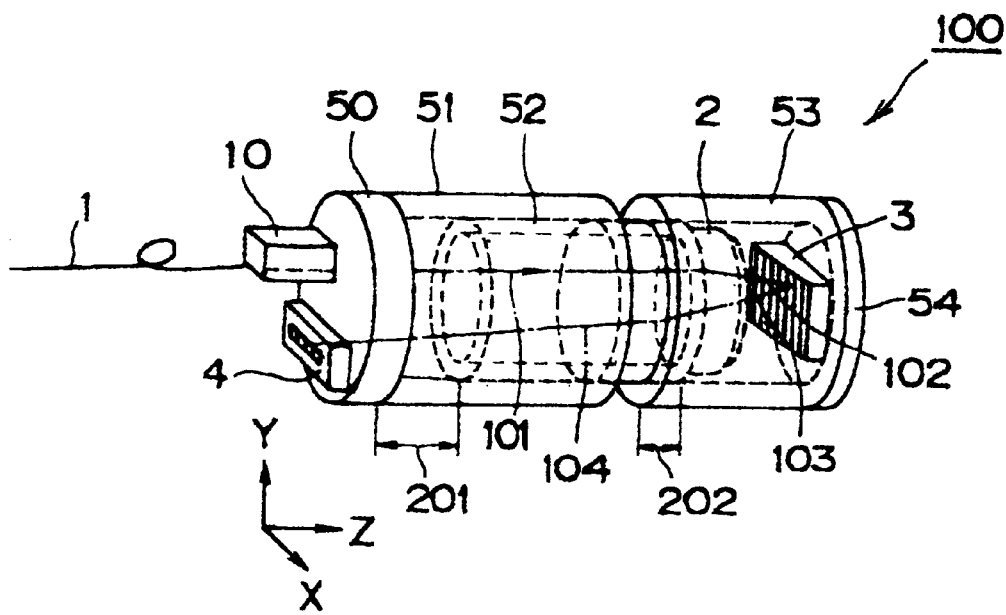
FIG. 1 is a schematic perspective view of an optical demultiplexer according to a first embodiment of the present invention.

FIG. 1 shows in schematic perspective an optical demultiplexer 100 according to a first embodiment of the present invention. As shown in FIG. 1, the optical demultiplexer 100 has three tubes, i.e., three hollow cylindrical tubes 51, 52, 53. A single-core input optical fiber 1 is fixed as by adhesive bonding to an end face (left-hand end face in FIG. 1) of the tube 51, which comprises a transparent tube for installing the optical fiber 1, through a fiber fixing window 50 and a fiber coupler 10. A collimator lens 2 is fixed as by adhesive bonding to an end face (right-hand end face in FIG. 1) of the tube 52. A reflective diffraction grating 3 is fixed as by adhesive bonding to an end face (right-hand end face in FIG. 1) of the tube 53 through a diffraction grating fixing window 54. Specifically, the diffraction grating 3 is fixedly mounted on the window 54 and positioned in the tube 53.

The tube 52 has opposite ends fitted respectively in the tubes 51, 53. The outside diameter of the tube 52 and the inside diameters of the tubes 51, 53 are selected such that the tubes 51, 52, 53 can slide with respect to each other without wobbling motion for movement along and rotation about their optical axes.

A divergent light beam 101 which is introduced from the input optical fiber 1 into the tubes 51, 52, 53 is spread depending on the numerical aperture of the input optical fiber 1, and reaches the collimator lens 2. The collimator lens 2 converts the divergent light beam 101 into a parallel beam 102, which reaches the diffraction grating 3. The diffraction grating 3 demultiplexes the parallel beam 102 into a plurality of beams 103 at the respective wavelengths depending on the chromatic dispersion characteristics of the diffraction grating 3. The beams 103 are then converted by the collimator lens 2 into respective convergent beams 104, which are focused into an array of respective beam spots on an end face of the window 50 that is positioned at the focal point of the collimator lens 2. A photodetector array 4 is fixedly mounted on the end face of the window 50 in conjugate relationship to the end of the input optical fiber 1 which is fixed to the end face of the window 50. The photodetector array 4 has an array of photodetectors that are aligned with the respective focused beam spots of the beam 104.

Heretofore, it has been the practice to actively align the optical components by applying light to the optical fiber 1, linearly moving the optical components along, X-, Y-, and Z-axes and/or angularly moving the optical components about a θz-axis (the optical axis or the Z-axis) in order to maximize the output power of the photodetector array 4. According to the first embodiment, however, the tubes 51, 52, 53 are slid relatively to each other for passive alignment such that the distance 201 between an end face of the tube 52 (which serves as a reference point for adjusting the collimator lens 2 on the tube 52 with respect to the input optical fiber 1) and the end face of the tube 51 (which serves as a reference point for adjusting the input optical fiber 1 on the tube 51 with respect to the collimator lens 2), and the distance 202 between the end face of the tube 52 (which serves as a reference point for adjusting the collimator lens 2 on the tube 52 with respect to the diffraction grating 3) and an end face of the tube 53 (which serves as a reference point for adjusting the diffraction grating 3 on the tube 53 with respect to the collimator lens 2) will be equalized to designed values, as observed using an optical microscope or a CCD camera.

According to the passive alignment, unlike the active alignment, the optical components are aligned by a simple mechanical positioning process rather than measuring whether the optical output power is maximum or not. It is important in achieving the passive alignment to employ a mechanism for centering optical components as easily as possible and to eliminate any difference between the centered and the position where the maximum optical output power is reached.

According to the first embodiment, the passive alignment can be accomplished by the simple structure shown in FIG. 1.

With respect to the tilt of the diffraction grating 3, the diffraction grating 3 can be angularly fixed to an angle Oz as detected by an optical microscope or a CCD camera. Therefore, simply by actively aligning the photodetector array 4 along the X- and Y-axes, the desired optical performance of the optical demultiplexer can be achieved easily within a short period of time.

The tubes 51, 52, 53 should preferably be made of a transparent and hard material in order to prevent themselves from being damaged and worn, and producing particles when slid against each other. For example, the tubes 51, 52, 53 should preferably be made of a transparent or translucent material, such as Pyrex, quartz glass, or the like, whose coefficient of linear expansion is $50\times10^{-7}/°$ C. or less, because such a material can maintain optical characteristics without adjustments even when the temperature changes. In order to avoid extraneous light from affecting the tubes 51, 52, 53, the tubes 51, 52, 53 may be colored or have ground surfaces for a reduced cost. The tubes 51, 52, 53 may thus be arranged such that the tube ends can be observed from outside at any arbitrary wavelengths. The diffraction grating 3, the window 54, and the tubes 51, 52, 53 should preferably be of the same material in order to prevent the diffraction grating 3 from being deformed under thermal stresses due to a heat shock or the like. However, even if the window 54 has a different coefficient of friction from those of the diffraction grating 3 and the tube 53, since the window 54 is of such a structure as to be subject to tensile stresses and compressive stresses in axial symmetry and the tilt of its window surface and hence the tilt of the diffraction grating are not liable to change, the window 54 may not necessarily be made of the same material as the diffraction grating 3 and the tube 53. The window 50 may be made of quartz glass, and the window 54 and/or the tubes 51, 52, 53 may be made of Pyrex for equalizing the refractive index of the input optical fiber 1 to the refractive index of the window 50. If the adhesive resin interposed between the input optical fiber 1 and the window 50 has a refractive index which is the same as the refractive index of the input optical fiber 1 and the window 50, then undesired back reflections to the input optical fiber 1 are reduced.

In the above embodiment, the tube 52 to which the input optical fiber 1 is fixed and the tube 53 to which the diffraction grating 3 is attached are slidably fitted over the opposite ends of the tube 52 to which the collimator lens 2 is attached. However, the opposite ends of the tube 52 may be slidably fitted over the tubes 51, 53, insofar as the tube ends can be observed from outside at any arbitrary wavelengths.

Figure 2:
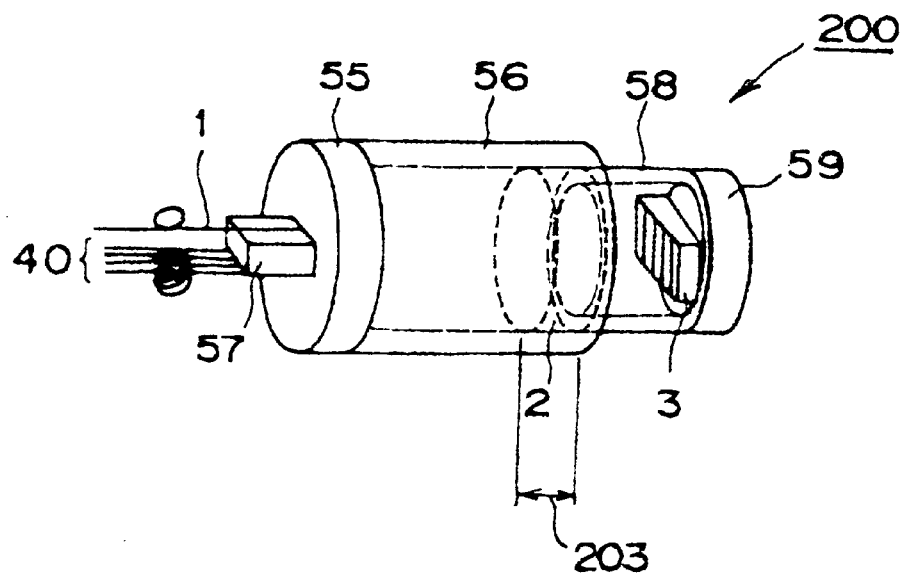
FIG. 2 is a schematic perspective view of an optical demultiplexer according to a second embodiment of the present invention.

FIG. 2 shows in schematic perspective an optical demultiplexer 200 according to a second embodiment of the present invention. As shown in FIG. 2, the optical demultiplexer 200 has a fiber fixing window 55 on an end face of a fiber installing tube 56, a fiber array board 57 mounted on the fiber fixing window 55, an input optical fiber 1 mounted on a side surface of the fiber array board 57 and fixed to the end face of the tube 56, an optical fiber ribbon 40 mounted on an opposite side surface of the fiber array board 57, a tube 58 having an end fitted in the tube 56, and a window 59 mounted on an opposite end of the tube 58. The collimator lens 2 is fixed to the end of the tube 58 that is fitted in the tube 56, and the diffraction grating 3 is fixed to the window 59 and positioned in the tube 58.

The optical fiber ribbon 40 comprises an array of closely arranged optical fibers (4, 8, or 12 optical fibers, for example) which are encased in a resin covering.

In the second embodiment, since the diffraction grating 3 and the collimator lens 2 are fixed respectively to the opposite ends of the single tube 58, the distance between the diffraction grating 3 and the collimator lens 2 cannot be adjusted. However, the optical components can more easily be aligned or centered than those of the first embodiment shown in FIG. 1 because only the two tubes 56, 58 are used as positionally adjustable tubes. Specifically, according to the first embodiment, after the optical components have been mounted on the three tubes, the two distances 201, 202 between the reference points need to be adjusted by sliding the three tubes for aligning or centering the optical components. According to the second embodiment, however, after the optical components have been mounted on the two tubes, only the distance 203 between two reference points, i.e., the end face of the tube 56 close to the tube 58 and the distal end of the collimator lens 2, needs to be adjusted by sliding the two tubes.

In FIGS. 1 and 2, the diffraction grating 3 is indicated by the solid lines for illustrative purposes though it should be indicated by the broken lines as it is located within the tube 53 or 58.

The foregoing description of a preferred embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An optical demultiplexer comprising:
    a plurality of tubes combined in axially slidably interfitting relationship to each other, said tubes being permeable to light;
    an input optical fiber;
    a collimator lens; and
    a diffraction grating;
    said input optical fiber, said collimator lens, and said diffraction grating being mounted on said tubes.

2. An optical demultiplexer according to claim 1, wherein each of said tubes comprises a hollow cylindrical tube.

3. An optical demultiplexer according to claim 1, wherein said optical fiber, said collimator lens, and said diffraction grating are fixed to end faces of said tubes.

4. An optical demultiplexer according to claim 1, wherein each of said tubes is made of a material selected from the group consisting of a transparent material, a translucent material, and a colored material.

5. An optical demultiplexer according to claim 1, wherein each of said tubes has a ground outer surface.

6. An optical demultiplexer according to claim 1, wherein each of said tubes has a coefficient of linear expansion which is at most $50\times10^{-7}/°$ C.

7. An optical demultiplexer according to claim 1, wherein said diffraction grating is made of a material which is the same as each of said tubes.

8. An optical demultiplexer according to claim 3, further comprising:
    a detector for detecting light introduced from said input optical fiber, applied through said collimator lens to said diffraction grating, demultiplexed by said diffraction grating, and converged by said collimator lens;
    said detector being positioned in conjugate relationship to an end of the input optical fiber fixed to the end face of one of said tubes.

9. An optical demultiplexer according to claim 8, wherein said detector comprises a photodetector array for detecting focused spots of the light demultiplexed by said diffraction grating and converged by said collimator lens.

10. An optical demultiplexer according to claim 1, wherein said tubes include three tubes, said input optical fiber, said collimator lens, and said diffraction grating being mounted respectively on said three tubes.

11. An optical demultiplexer according to claim 10, wherein the tube on which said input optical fiber is mounted and the tube on which said diffraction grating is mounted are slidably fitted over respective opposite ends of the tube on which said collimator lens is mounted.

12. An optical demultiplexer according to claim 1, wherein said tubes include two tubes, said input optical fiber being mounted on an end face of one of said two tubes, said collimator lens and said diffraction grating being mounted on respective opposite end faces of the other of said two tubes.

13. An optical demultiplexer according to claim 12, wherein the tube on which said input optical fiber is mounted is slidably fitted over the tube on which said collimator lens and said diffraction grating are mounted.

14. A method of assembling an optical demultiplexer having an input optical fiber, a collimator lens, and a diffraction grating, comprising the steps of:

preparing a plurality of tubes dimensioned to be combined in axially slidably interfitting relationship to each other, said tubes being permeable to light;

installing said input optical fiber, said collimator lens, and said diffraction grating on said tubes;

bringing said tubes into axially slidably interfitting relationship to each other; and sliding said tubes relatively to each other to set the distance between reference points related to said input optical fiber, said collimator lens, and said diffraction grating to a predetermined value for thereby achieving centered alignment.

* * * * *